US008880997B2

(12) United States Patent  (10) Patent No.: US 8,880,997 B2
Jardine-Skinner et al.  (45) Date of Patent: Nov. 4, 2014

(54) SERVICE REGISTRY POLICY AGGREGATOR

(75) Inventors: Evan G. Jardine-Skinner, Hampshire (GB); James R. Orchard, Hampshire (GB); Philip D. Rowley, Eastleigh (GB); Samuel J. Smith, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/461,304

(22) Filed: May 1, 2012

(65) Prior Publication Data

US 2012/0216100 A1  Aug. 23, 2012

Related U.S. Application Data

(63) Continuation of application No. 12/849,948, filed on Aug. 4, 2010, now abandoned.

(30) Foreign Application Priority Data

Aug. 5, 2009 (EP) .................................... 09167242

(51) Int. Cl.
*G06F 17/00* (2006.01)
*G06F 17/30* (2006.01)
(52) U.S. Cl.
CPC ................. *G06F 17/30011* (2013.01)
USPC ............. 715/234; 715/205; 715/709
(58) Field of Classification Search
USPC ......... 715/205, 209; 709/224; 726/1
See application file for complete search history.

(56) References Cited

U.S. PATENT DOCUMENTS

| 2004/0199896 | A1 | 10/2004 | Goodman et al. |
| 2006/0075466 | A1 | 4/2006 | Ramanathan et al. |
| 2008/0046335 | A1 | 2/2008 | Zhou |
| 2008/0065466 | A1 | 3/2008 | Liu et al. |
| 2009/0055367 | A1 | 2/2009 | Colgrave et al. |
| 2009/0055432 | A1 | 2/2009 | Smith et al. |
| 2009/0172520 | A1 | 7/2009 | Kim |
| 2010/0088403 | A1 | 4/2010 | Kufluk et al. |
| 2011/0047451 | A1 | 2/2011 | Jardine-Skinner et al. |

OTHER PUBLICATIONS

Office Action dated Jun. 7, 2012 for U.S. Appl. No. 12/849,948, Evan G. Jardine-Skinner et al., filed Aug. 4, 2010.
Jack Rusher, Triple Store, Feb. 2005, World Wide Web Consortium.

*Primary Examiner* — Cesar Paula
*Assistant Examiner* — Howard Cortes
(74) *Attorney, Agent, or Firm* — Thomas E. Lees, LLC

(57) ABSTRACT

A method of operating a service registry and repository based on a triplestore comprises: receiving a request to aggregate a service document; shredding elements of the service document to create logical objects within the triplestore; for each logical object, searching for all policy attachments logical objects that have a relationship with the logical object; for each located policy attachment, retrieving details of the policy and building a list of policies and associated logical objects in the repository; and returning an indication of the list of polices and associated logical objects. The list of logical objects and associated polices is used to compile a service document containing details of policies that have relationships with the selected service document logical objects. Objects that have associated polices are rendered with a hypertext policy icon next to the object and selection of the hypertext policy icon opens a new window with the policy details.

27 Claims, 8 Drawing Sheets

SERVICE REGISTRY POLICY AGGREGATOR

CROSS-REFERENCE TO RELATED APPLICATIONS

This application is a continuation of U.S. patent application Ser. No. 12/849,948, filed Aug. 4, 2010, entitled "SERVICE REGISTRY POLICY AGGREGATOR", now pending, which claims priority to European Patent Application No. 09167242.8, filed Aug. 5, 2009, the disclosures of which are hereby incorporated by reference.

BACKGROUND

Various aspects of the present invention relate in general, to registry and repository systems and methods, and in particular, to service registry and repository systems and methods based on a triplestore database for operating a policy aggregator.

Service oriented architecture (SOA) is a business-driven, information technology (IT) architectural approach that supports integrating business domains as linked, repeatable business tasks, or services. The basic building block is a service document that defines an associated service so that the service can be managed with other services. A service document contains information about an associated service, including the location of the service, details about the service and how to access the service. Service documents are used by analysts, architects, and developers during a Development Phase of the SOA life cycle to locate services to reuse and to evaluate the impact of changes to service configurations. Service documents are variously described as metadata, objects, descriptions, entities and artifacts.

A service repository stores the service document and allows access to the service document and thereby the corresponding service. A service registry is an index of a subset of information about a service (for example the location and name of service document) enabling the corresponding service document to be located and accessed in a repository (or even the corresponding service located at the service provider). An integrated service registry and repository allows a service operation to use both the indexed service information in the registry and the detailed service information in the repository. An example of an integrated service registry and repository is the IBM® WebSphere® Registry and Repository (WSRR).

Such an integrated service registry and repository has advantages of greater business agility and resilience through reuse compared to separate service registry and repository systems. Further advantages of looser coupling, greater flexibility, better interoperability, and better governance also arise from the integration of a service registry and a repository. These advantages are addressed by separating service descriptions from their implementations, and using the service descriptions across the life cycle of the service. Standards-based service metadata artifacts, such as Web Service Definition Language (WSDL), extensible mark-up language (XML) schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purposes it serves.

WS-Policy is a World Wide Web Consortium (W3C) standard that is intended to provide a means for specifying policies that need to be applied to Web Services and specifically, service documents. The WS-Policy-Attach specification, also controlled by the W3C, specifies a standardized means by which policy attachments can be defined to link a policy to a service object referenced in a service document. Service objects or logical objects are derived from documents such as Web Service Definition Language (WSDL) documents, Extensible Markup Language (XML) documents, XML schema definition (XSD) documents, Web Service Policy (WS-Policy) documents etc., when they are loaded into the Service Registry environment. The WS-Policy-Attach specification declares different means of associating policies with target elements in WSDL documents: 1) an element in a WSDL document having an embedded policy; 2) an element in a WSDL document having an embedded policy reference referencing an external policy in a policy attachment file; 3) an embedded policy in external policy attachment file having a reference to an element in a WSDL document; 4) and embedded policy reference in an external policy attachment file referencing an element in a WSDL document and a policy in another external policy attachment file.

A policy is a rule that is applied to an object by an environment. For instance, access to an object can be controlled by applying a rule that only entities with a certain token can have access to the object. Since there is more than one way of specifying polices, there is no way of being able to retrieve a WSDL service definition file that encapsulates all of the policies that may have been linked directly or indirectly, to or from the logical object referenced in the service document.

BRIEF SUMMARY

According to various aspects of the present invention, a method of operating a service registry and repository comprises receiving a request to aggregate a service document comprising elements and shredding the elements of the service document to create logical objects within the triplestore. Operating the service registry and repository further comprises searching, for each logical object, for all policy attachments that have an association with the logical object, retrieving, for each located policy attachment, details of the policy and building a list of policies and associated logical objects in the triplestore, and returning an indication of the list of polices and associated logical objects.

Further aspects of the present invention may comprise using the list of logical objects and associated polices to compile a service document containing details of all the policies that have relationships with the selected service document logical objects.

DETAILED DESCRIPTION

Various aspects of the present invention provide a service registry and repository for service documents, e.g., based on IBM WebSphere Service Registry and Repository. Such service documents include traditional internet services that use a range of protocols and are implemented according to a variety of programming models.

Various aspects of the present invention provide a unified view of WSDL service definitions that includes an aggregated view of all of the policy attachments that have been declared as applicable to elements within the WSDL in a service registry environment.

Further aspects of the present invention use a triplestore database to store data in data structure comprising three pieces of information in the form subject-predicate-object. The purpose of triplestore is to increase performance in searching for information in a large volume of complex data and as such is well suited to the application of a service registry and repository where the number and complexity of the data is large.

Figure 1:
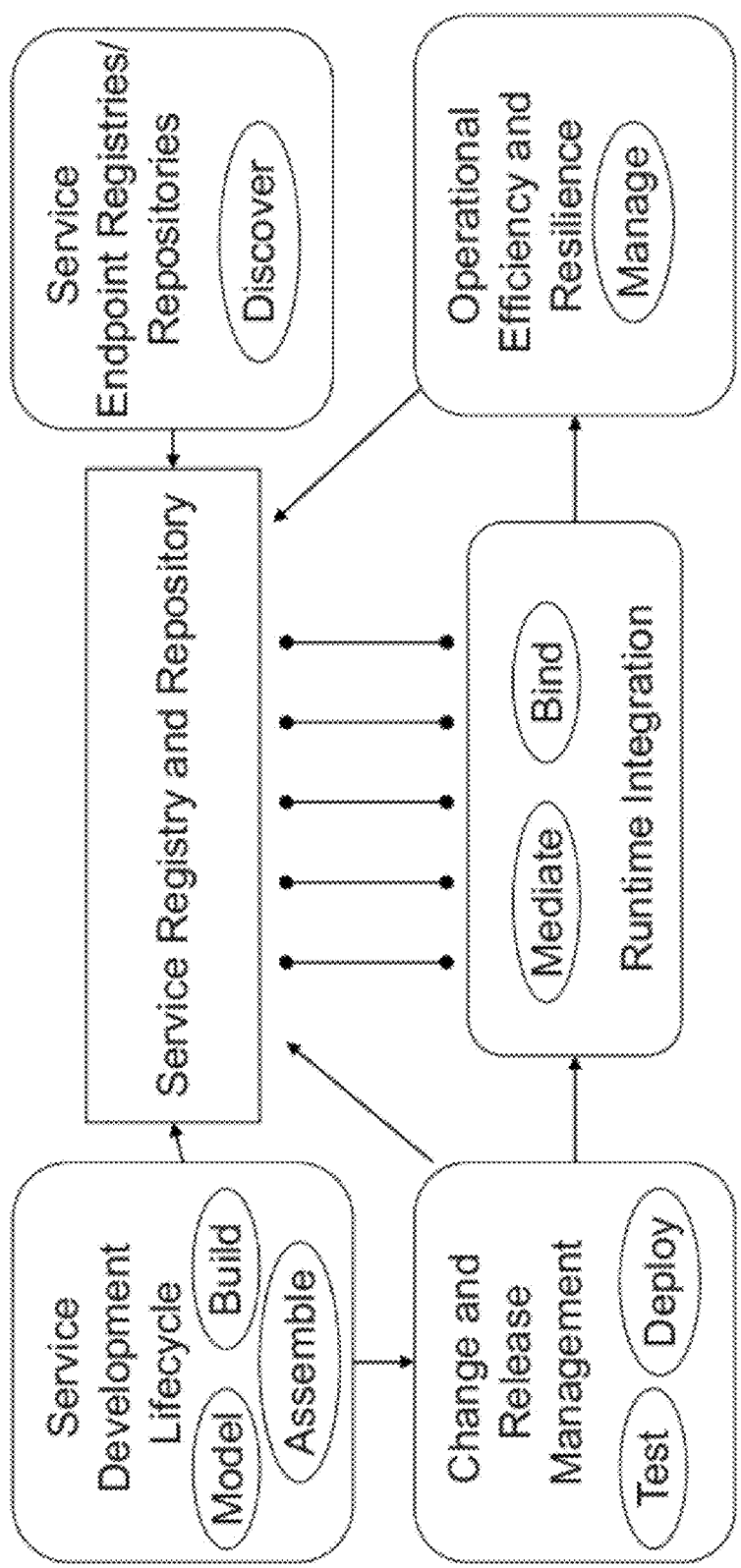
FIG. 1 is a schematic of service document phases in a service registry and repository according to aspects of the present invention.

Referring now to the drawings and in particular, to FIG. 1, phases of a service life cycle are illustrated. The phases of the services stored as documents in the service registry and repository comprise: Service Development; Change and Release Management; and Runtime Integration and Operation. As the integration point for service metadata, the service registry and repository establishes a central point for finding and managing service metadata acquired from a number of sources, including service application deployments and other service metadata and endpoint registries and repositories. The service registry and repository is where service metadata that is scattered across an enterprise is brought together to provide a single, comprehensive description of a service.

For instance, as illustrated, the service registry and repository can collect service metadata associated with the service development lifecycle, including model, build and assemble aspects. The service registry and repository can also collect service metadata associated with change and release management including test and deploy aspects. The service registry and repository can also collect service metadata associated with operational efficiency and resilience including management aspects. Still further, the service registry and repository can collect service metadata associated with service endpoint registries and repositories including Discover aspects. The service registry and repository further interacts with runtime integration including mediate and bind aspects. Once this happens, visibility is controlled, versions are managed, proposed changes are analyzed and communicated, usage is monitored and other parts of the service architecture can access service metadata with the confidence that they have found the copy of record.

Software Architecture

Figure 2:
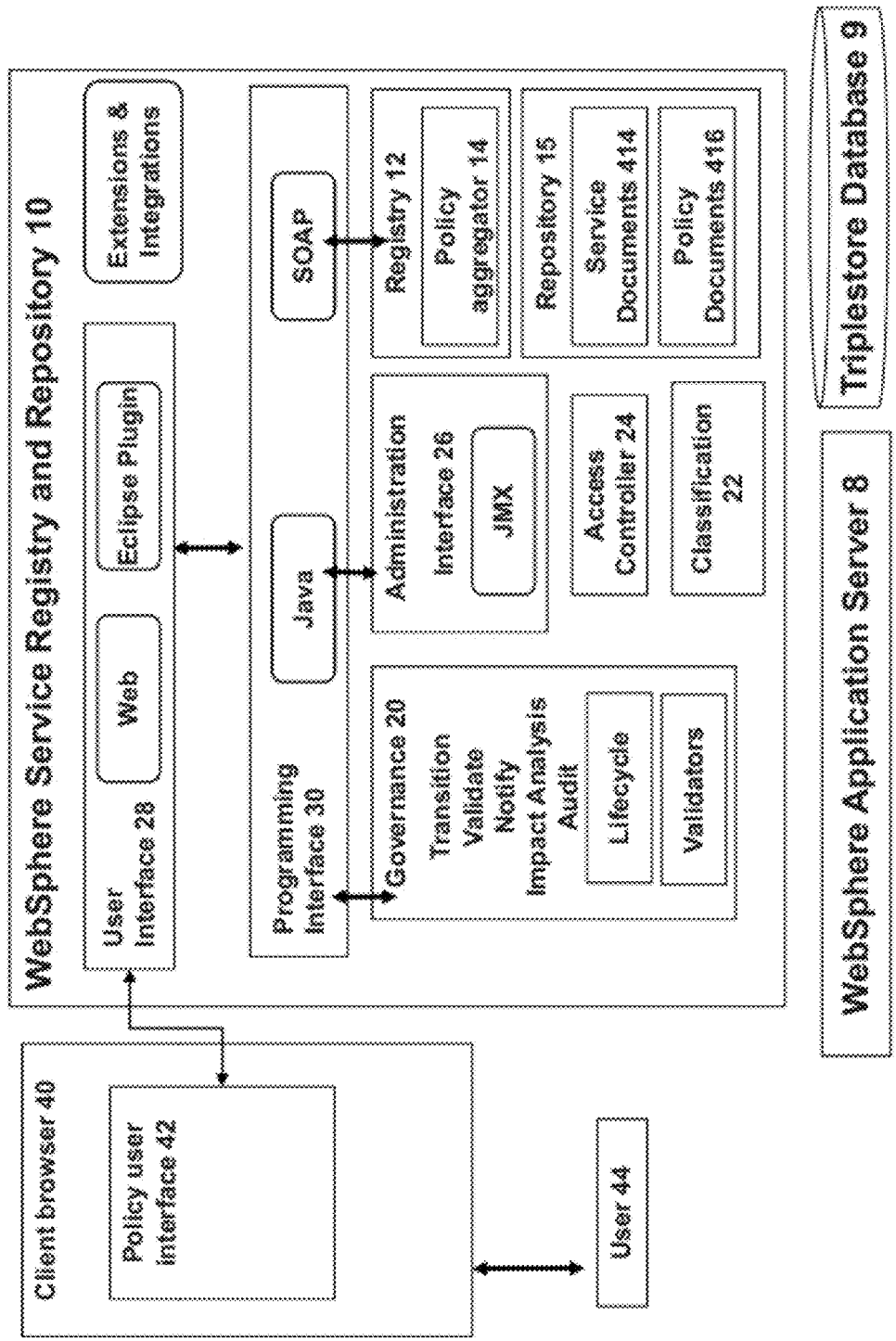
FIG. 2 is a schematic of select components of a service registry policy aggregator architecture according to aspects of the present invention.

Referring to FIG. 2, an illustrative system comprises an application server 8, such as a WebSphere Application Server, a triplestore database 9 and a service registry and repository 10, such as a WebSphere Service Registry and Repository. Top level components of the service registry and repository 10 comprise: a registry 12; repository 15; a governor 20; an administration interface 26; a user interface 28; and a programming interface 30.

The service registry and repository of an exemplary embodiment is a Java™ 2 Platform Enterprise Edition (J2EE) application that runs on a WebSphere Application Server 8 and uses the triplestore database 9 as a backing store to persist the service metadata. The service registry and repository takes advantage of the role-based access control so that role-based views and access control can be turned on when the service registry and repository is deployed as an enterprise-wide application.

The registry 12 offers both registry function and repository function for service metadata. The repository function allows users to store, manage and query service metadata artifacts holding service descriptions. The registry 12 not only takes care of the documents containing service metadata by reliable persistence of the data, but the registry 12 also provides a fine-grained representation of the content of those documents (for example, ports and portTypes in some service documents). The registry function makes provision for decorating registered service declarations and elements of the derived content models with user-defined properties, relationships, and classifiers. The registry 12 provides a policy editor 14, also referred to as a policy aggregator.

Repository 15 stores all artifacts including service documents 414, such as domain policy definitions, and policy documents 416.

Classification component 22 allows service descriptions and parts of service definitions to be annotated with corporate vocabulary and to capture the governance state. Service classification systems are captured in web ontology language (OWL) documents that are loaded into the Service Registry and Repository using the administrative interface. Service registry and repository entities can be classified with values from these classification systems, to allow classification-based queries to be performed, and to allow access restrictions based on classification.

Access controller 24 supports a fine-grained access control model that allows for the definition of which user roles can perform specific types of actions on corresponding artifacts. Visibility of services can be restricted by business area and user roles can be restricted from transitioning services to certain life cycle states. This is in addition to the role-based access control provided by the service registry and repository.

Administration interface 26 supports the import and export of repository content for exchange with other repositories and provides an API for configuration and basic administration. The administration interface 26 thus supports interactions with the Classification component 22 and the Access Controller 24.

User interface 28 comprises a web interface and an Eclipse* plug-in interface to enable interaction with service registry and repository. A servlet based web user interface (UI) support is the main way for users representing different roles to interact with the service registry and repository. The web interface supports all user roles, offering lookup, browse, retrieve, publish, and annotate capabilities, as well as governance activities, such as import/export and impact analysis. A subset of this user interface is offered as an Eclipse plug-in to meet developer needs and analyst users needs that use Eclipse based-tooling. The Eclipse plug-in is used primarily for lookup, browse, retrieve and publish capabilities. The Web-based user interface can also be used for performing service metadata management and governance.

Programming interface 30 uses Java and Service Oriented Architecture Protocol (SOAP) APIs to interact programmatically with the registry 12. These APIs provide basic create, retrieve, update and delete (CRUD) operations, governance operations, and a flexible query capability. The SOAP API is used to communicate content using XML data structures. The Java API is used to communicate content using service data object (SDO) graphs. Using either the user interface 30 or the programming interface 28 documents and concepts managed by WebSphere Service Registry and Repository can be created, retrieved, updated and deleted. However, logical entities in the logical model cannot be modified and can only be changed by updating a document that contains the logical entity. Concepts can be created, retrieved and deleted.

The service registry and repository of an exemplary embodiment supports two application programming interfaces (APIs), including a Java-based API and a SOAP-based API that can be used to interact with the registry 12, the repository 15, the governance component 20 and the administration interface 26, respectively. Both APIs support publishing (creating and updating) service metadata artifacts and metadata associated with those artifacts, retrieving service metadata artifacts, deleting the service metadata artifacts and the metadata associated with those artifacts, and querying the content of the registry and repository. The programming APIs use Service Data Objects (SDO) to capture the data graphs inherent in the content model, allowing access to physical documents, logical parts of the physical documents, and concepts. The SOAP API uses XML documents to similarly represent Service Data Objects to communicate content structures in both the physical and logical model.

Client browser 40 displays the policy user interface 42 for editing by user 44.

Information Architecture

Figure 3:
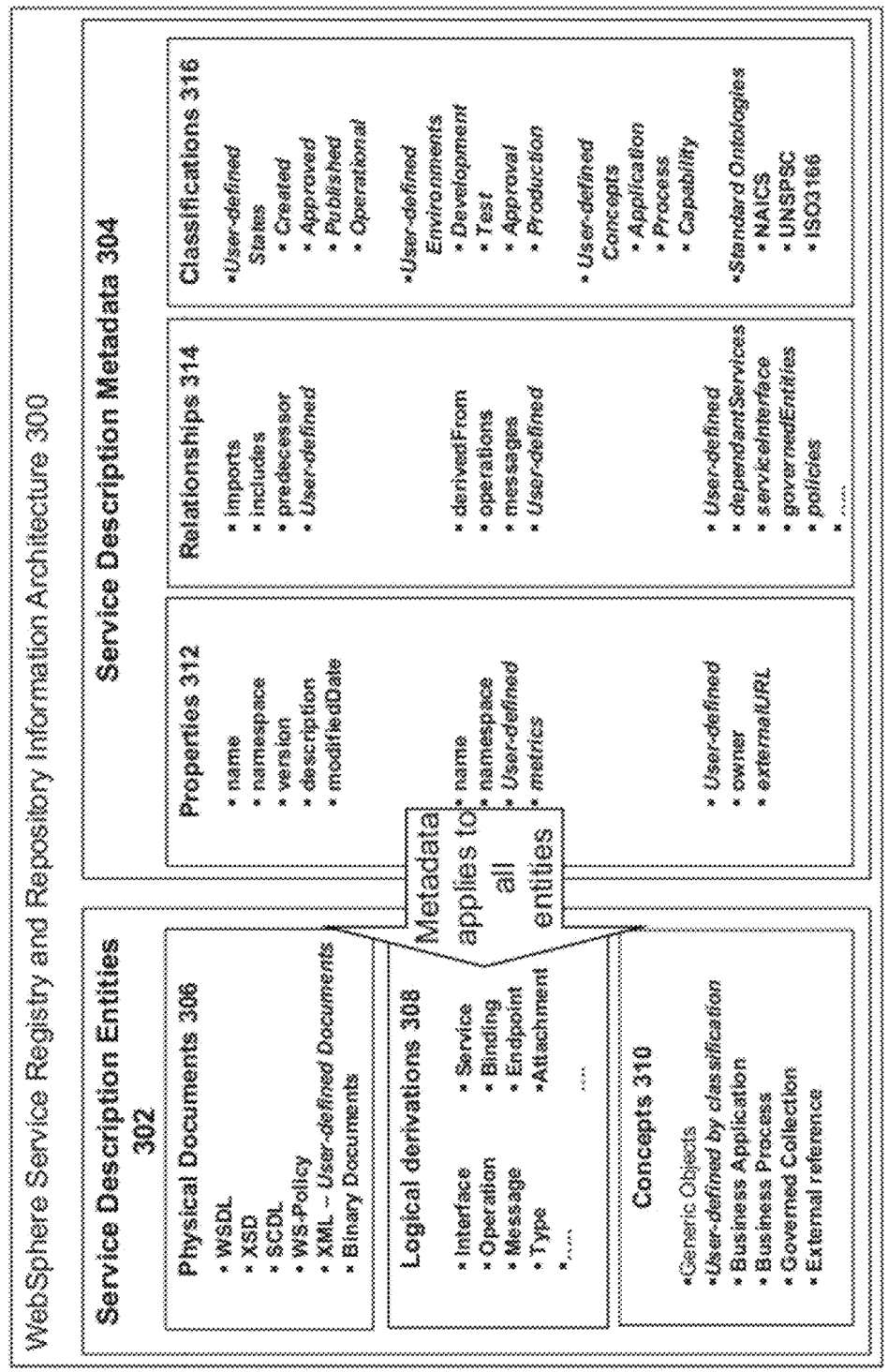
FIG. 3 is a schematic of an exemplary information architecture arrangement according to various aspects of the present invention.

Referring to FIG. 3, the information architecture 300 of an exemplary embodiment is described. Broadly, information architecture 300 has entities representing service description entities 302 and service description metadata 304. All artifacts have an assigned URI, a name and a description. Examples of each type of artifact are shown in FIG. 3 but are not necessarily referred to in the description.

Service Description Entities 302 comprises physical documents 306, logical derivations 308 and concepts 310. Physical Documents 306 are XML documents that are known as service metadata artifacts. Logical derivations 308 are the finer-grained pieces of content that result when some types of physical document are shredded as they are loaded into Registry and Repository. Concepts 310 are generic entities that are usually typed, and represent anything that is not represented by a document in Registry and Repository. All three types of service description entities can be use in queries, have service annotations applied, and have relationships established from and to them.

The most elemental building blocks for the WebSphere Service Registry and Repository are the physical documents 306 such as XSD, WSDL, SCDL or WS-Policy documents. In addition any XML service metadata artifact type or binary document can be stored in WebSphere Service Registry and Repository and receive the benefits of broader visibility, reuse, management, and governance. The coarse-grained model made up from registry objects that represents those documents is referred to as the physical model. Documents are versionable objects in the WebSphere Service Registry and Repository content model, which means that in addition to a URI, name, and description, they also have a version property.

For some of the physical document types, WebSphere Service Registry and Repository derives logical objects and stores them in logical derivations 308. For instance, WebSphere Service Registry and Repository can "shred" a document upon receipt into a set of logical objects to enable users to explore WebSphere Service Registry and Repository content beyond the boundaries of the files stored. Logical objects are not versionable. For some physical document types, WebSphere Service Registry and Repository defines predefined properties and detects relationships to other physical documents. An XSD document, for example, has a target Namespace property and the relationships with other imported XSD documents, other redefined XSD documents and other included XSD documents. When an entry for a certain physical document is created in WebSphere Service Registry and Repository, it is inspected for relationships to other artifacts. If not already represented in WebSphere Service Registry and Repository, a related artifact is also added, and in either case the relationship between the artifacts is recorded.

The set of logical derivations comprises the logical model of WebSphere Service Registry and Repository. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. In an exemplary implementation, all individual results of document shredding are aggregated into one logical model that represents not only the content of individual documents, but also relationships between content in different documents.

WebSphere Service Registry and Repository stores other types of service metadata using the XML Document, a generic document type. Documents of type XMLDocument are not decomposed into the logical model.

WebSphere Service Registry and Repository uses a concept to represent anything that does not have a physical document. Concepts 310 are used to represent a reference to content in some other metadata repository, such as a portlet in a portlet catalogue or an asset in an asset repository. It can also be used to group physical artifacts together to govern them as a unit, for example, concepts can be versioned.

In addition to content directly related to entities 302, WebSphere Service Registry and Repository supports a number of metadata types that are used to describe entities 302. These metadata types are referred to as service description metadata 304. WebSphere Service Registry and Repository supports three types of service semantic metadata types: properties 312; relationships 314; and classifications 316. All three types describe physical model entities, logical model entities, and/or concepts. For example, service description metadata can be used to associate a property "businessValue" with a physical model entity representing a WSDL file. It might also be used to define a new relationship "makesUseOf" between an entity in the logical model representing a "portType" and an entity in the physical model representing an XML document. Furthermore one could create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

Properties 312 are simple name/value pairs that are associated with any of the Service Description Entities 302. Some properties are assigned by the system, such as the unique id, the owner, and the last time the service entity was changed. These system-assigned properties cannot be changed. Others are derived through the "shredding" of a key-type service description document into its logical model. Properties of this type include name and namespace. Sometimes these system-assigned values are allowed to be changed and properties can be created. Such a user-defined property can be used as a simple, unstructured and untyped extension mechanism. Properties 312 can be used in queries, and can be used to establish fine-grained access control.

Relationships 314 tie together one source service description entity to one or more target service description entities. Every relationship is given a name and a source is only allowed to have a single relationship with a given name. Some relationships are assigned by WebSphere Service Registry and Repository during the "shredding" of key types of documents. The relationship established between XSD documents based on the importing of one into the other is one such system-assigned relationship. Relationships can also be user defined. For example, a user can: relate a concept that represents an external object to a service using a user defined relationship; relate all of the service description documents that will be governed as a unit to a governable entity, and/or relate a monitoring policy to a service endpoint.

A user can load classification 316 into a registry where it can then be used to apply semantic meaning to service description entities 302. Classification systems are documents encoded using the Web Ontology Language (OWL). The registry represents OWL Classes as classifiers and interprets the subTypeOf relationship between those Classes as establishing a classifier hierarchy. Other OWL concepts such as data or relationship representing properties or other built-in OWL relationships are ignored. A classification system is imported into the registry as a whole and updates are made by importing a modified version of the ontology. Any class in the underlying ontology can be used as a classification, the same classification can be used to classify multiple entities and an entity can be associated with multiple classifications.

Policy Aggregator

Figure 4:
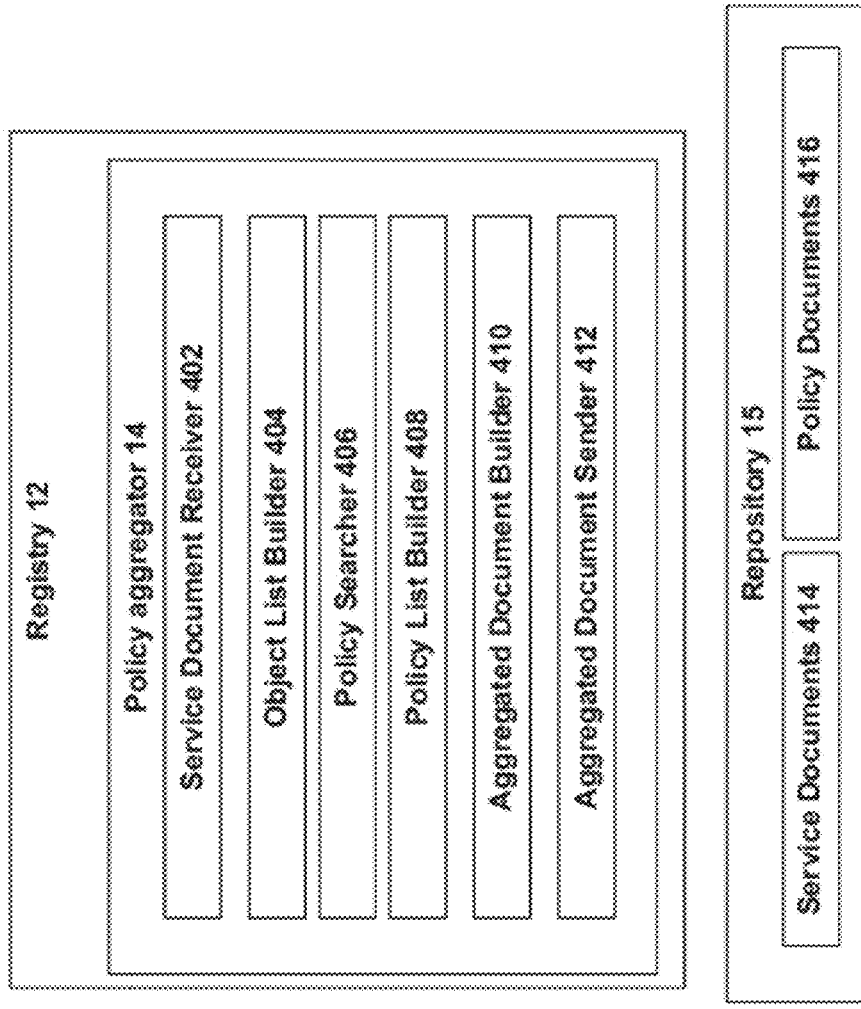
FIG. 4 is a schematic of an exemplary policy aggregator according to various aspects of the present invention.

Referring to FIG. 4, an exemplary policy aggregator 14 is illustrated comprising: a service document receiver 402; an object list builder 404; a policy searcher 406; a policy list builder 408; an aggregated document builder 410; and an aggregated document sender 412.

Service document receiver 402 is for receiving a selected service document from a user. In an exemplary embodiment, a universal resource identifier (URI) is used to identify the selected document in the repository 15 inside an internet message requesting the policy aggregator to aggregate policies for the selected service document.

Object list builder 404 is for parsing the selected service document for all objects embedded in the selected document or in documents referenced by the selected document (single reference or multiple references). An illustrative way of building the object list is to shred the elements of the service document to create logical objects within the triplestore 9.

Policy searcher 406 is for searching for policies in the selected document or somewhere in the repository. Each policy in the repository is parsed for an association to or from objects in the object list.

Policy list builder 408 is for building a list of all the policies that have associations with objects in the object list, together with the object, the location of the object and the type of association.

Aggregated document builder 410 is for building an aggregated document list of all the associated policies. In an exemplary embodiment, all the policy details are included in the document in a discrete way so that the user can examine what policies are related to the document. In another exemplary embodiment, only references to the policies are included.

Aggregated document sender 412 returns the aggregated document to the user.

Policy Aggregation

Figure 5:
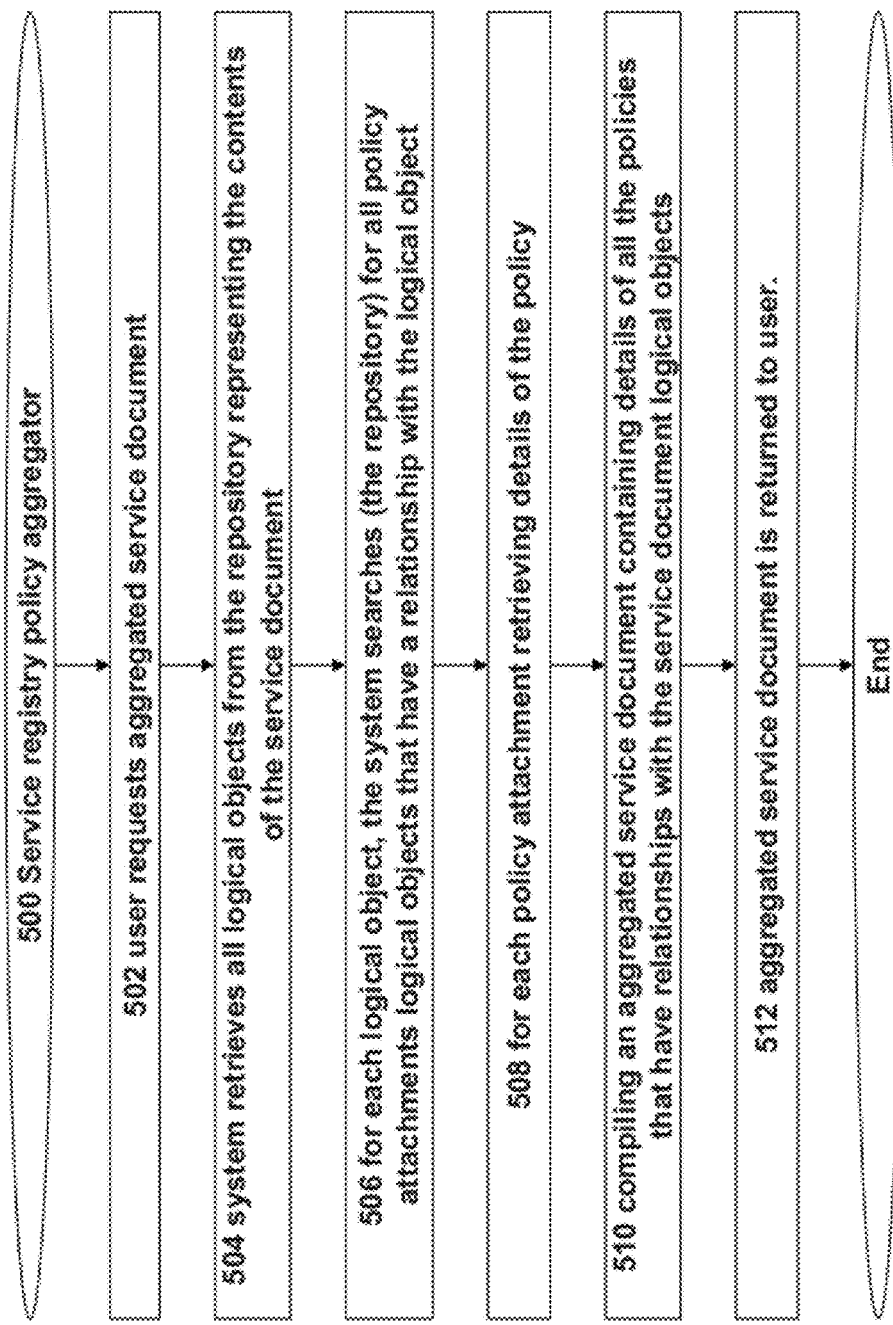
FIG. 5 is a schematic of a process implemented, e.g., by the policy aggregator of FIG. 4, according to various aspects of the present invention.

Referring to FIG. 5, a method flow 500 of policy aggregator 14 is shown according to an exemplary embodiment of the invention.

At 502, the user requests an aggregated service document. The user can request the aggregated view in a variety of ways. For example, the user can request the aggregated view through a user-interface which may, for example, present a view of the document such as is shown in the screen capture of FIG. 6, which shows that the 'PortType' within the WSDL document called 'StockQuote' has a policy called 'myTestPolicy' attached to it.

At 504, the policy aggregator 14 retrieves all logical objects from the repository representing the contents of the service document. Upon load, the system analyses the documents (which are all XML based) using standard parsing techniques in order to derive a set of objects that represent the contents of the documents. These objects are then linked together in the database in order to preserve the structure of the document contents and can be retrieved as 'object graphs'. Object graphs can be considered as a set of software objects that are linked together via references in memory to represent a structure of something—in this case, the contents of the documents.

At 506, for each logical object, the policy aggregator 14 searches for all policy attachments associated with logical objects that have a relationship with the logical object. In an exemplary embodiment by default the search is performed over the whole repository. The repository can indicate another repository to be searched.

At 508, for each policy attachment, the policy aggregator 14 retrieves details of the policy and builds a list of logical objects and associated policies in the repository.

At 510, the policy aggregator 14 uses the list of logical objects and associated polices and compiles an aggregated service document containing details of all the policies that have relationships with the service document logical objects. In an exemplary embodiment the policy details are included in the document associated with the object in the document.

At 512, the policy aggregator 14 returns an aggregated service document to user and the user client browser renders the aggregated service document.

In an exemplary embodiment, objects that have associated polices are rendered differently from objects that have no associated policies and optionally, a hypertext policy icon is displayed next to the object. Moreover, the user may be able to examine the aggregated service document, e.g., as rendered in the browser. When the user selects a hypertext policy icon then a new browser window, tab window or pop up window is displayed with the policy details. The user can select one or the window types or configure the Service Registry to default one of them.

EXAMPLE

Figure 6:
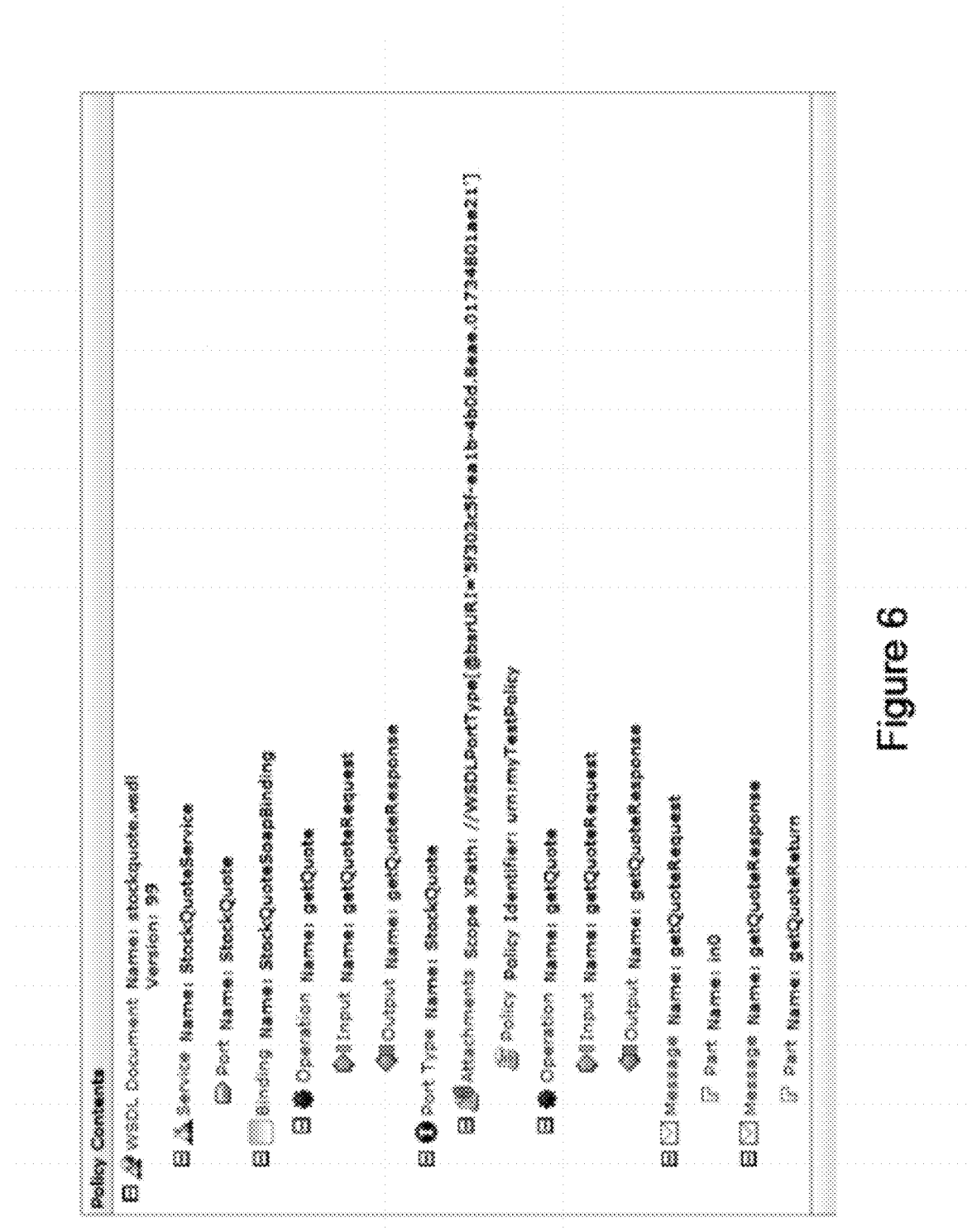
FIG. 6 shows an example WebSphere Service Registry and Repository screenshot.

Referring to FIG. 6, a screen shot illustrates a service document (Name: stockquote.wdsl version:99 URI:1fefb81f-90a2-42e5.81b5.dfbcf4dfb564) containing service elements. This screen capture was taken from IBM WebSphere Service Registry and Repository v6.2 and is essentially an XML format. Element PortType Name:StockQuote (a port having a name StockQuote) has an attachment identified as a policy but no other details. After policy aggregation the aggregated policy details (or a reference to the policy) are embedded into the element.

Figure 7:
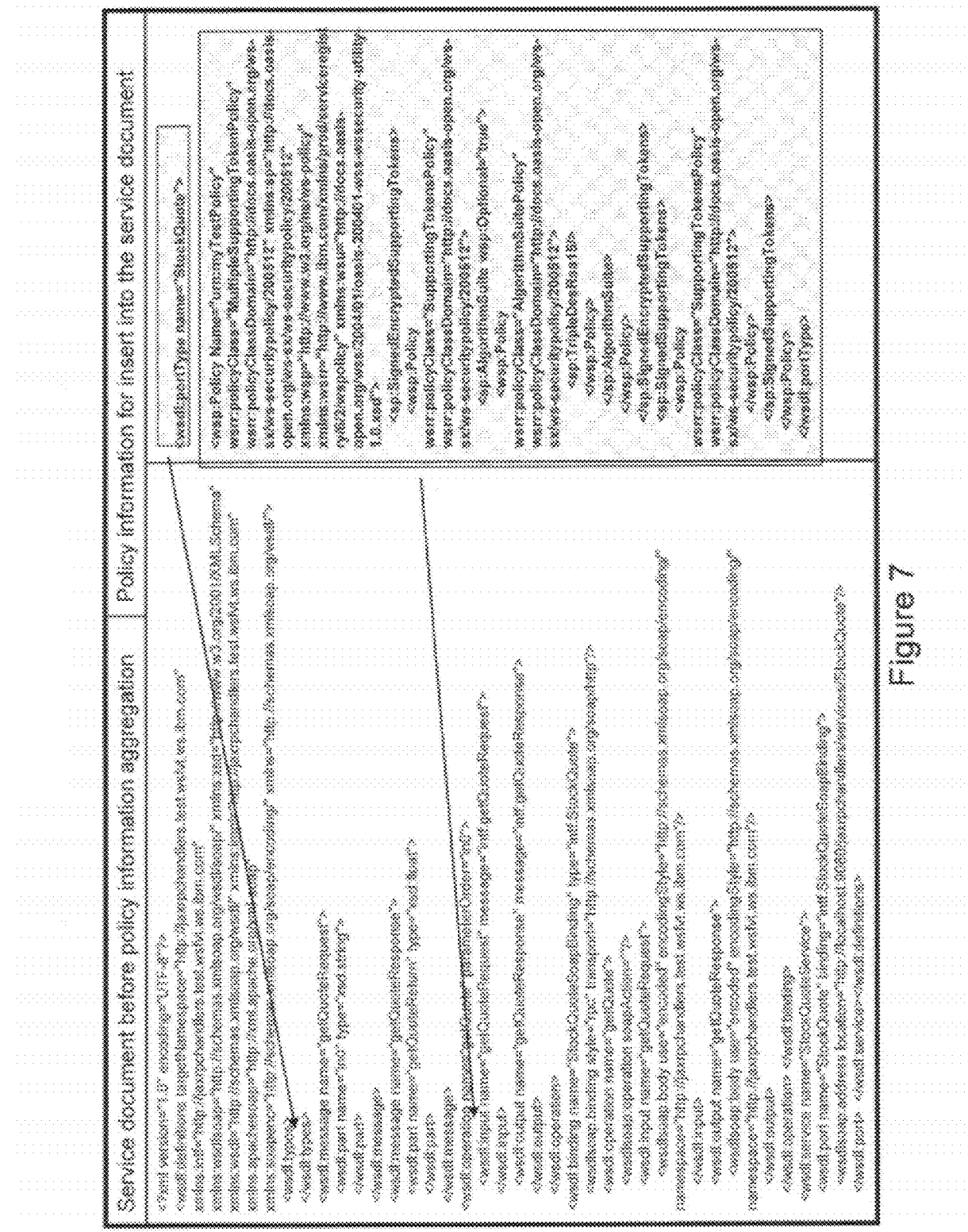
FIG. 7 is an exemplary service document before policy information aggregation.

The service document XML code is shown in the left hand of the table of FIG. 7. The aggregated policy details are show in the right hand column of FIG. 7 and the arrows in FIG. 7 indicate where in the service document the policy details are inserted.

Other Embodiments

It will be clear to one of ordinary skill in the art that all or part of the methods described herein may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to exemplary embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The present invention may further suitably be embodied as a computer program product for use with a computer system. The series of computer readable instructions embodies all or part of the functionality previously described herein. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, exemplary embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, exemplary embodiment of the present invention may be realized in the form of a data carrier having functional data thereon, said functional data comprising functional computer data structures to, when loaded into a computer system and operated upon thereby, enable said computer system to perform all the steps of the method.

Figure 8:
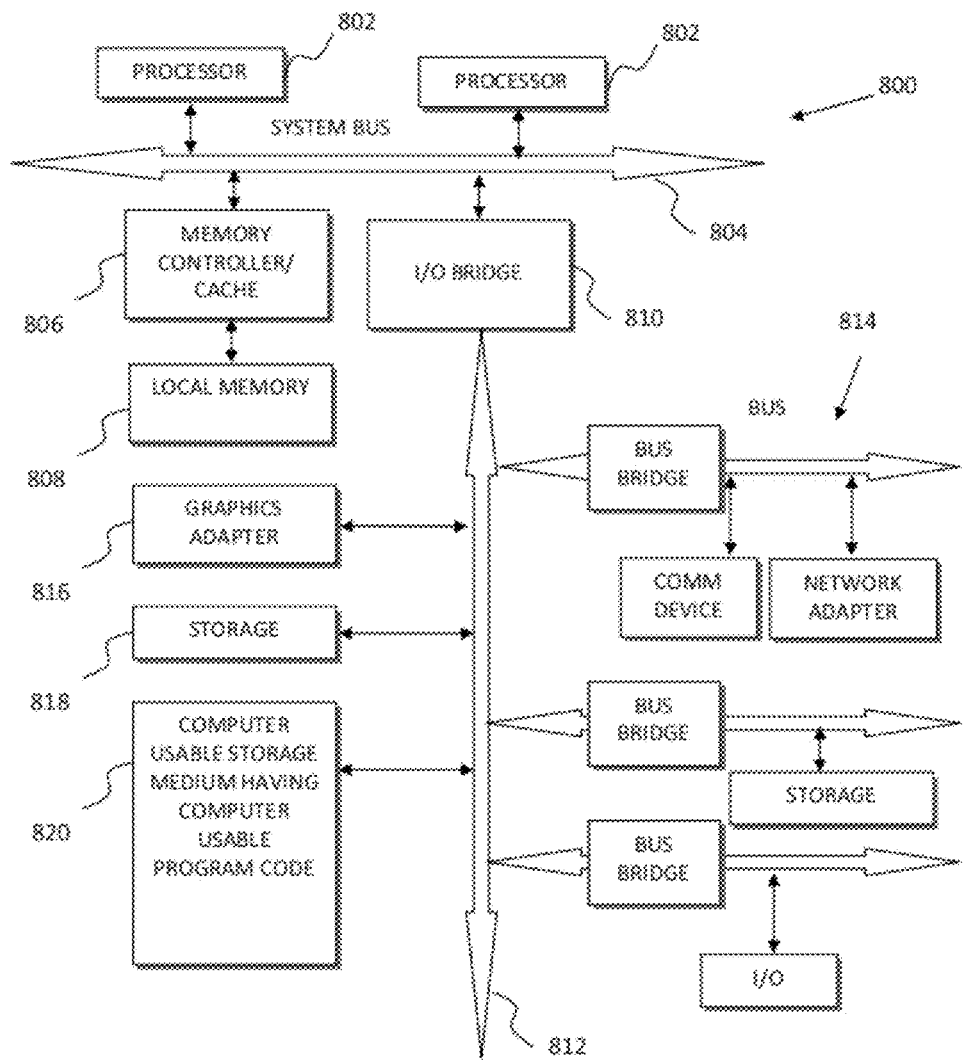
FIG. 8 is a block diagram of a computer system having a computer readable storage medium for implementing one or more of the methods and/or components described in greater detail herein, according to various aspects of the present invention.

Referring to FIG. 8, a block diagram of a data processing system is depicted in accordance with various aspects of the present invention. Data processing system 800, such as a server, may comprise a symmetric multiprocessor (SMP) system or other configuration including a plurality of processors 802 connected to system bus 804. Alternatively, a single processor 802 may be employed. Also connected to system bus 804 is memory controller/cache 806, which provides an interface to local memory 808. An I/O bus bridge 810 is connected to the system bus 804 and provides an interface to an I/O bus 812. The I/O bus may be utilized to support one or more buses and corresponding devices 814, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 816, storage 818 and a computer usable storage medium 820 having computer usable program code embodied thereon. The processor(s) 802 execute(s) computer usable program code to implement any aspect of the present invention, for example, to implement any aspect of any of the methods and/or system components illustrated in FIGS. 1-7. Moreover, the computer usable program code may be utilized to implement any other processes that are used to implement service registry and repository systems and methods, e.g., based on a triplestore database for operating a policy aggregator, as described more fully herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon, e.g., providing program code for use by or in connection with a computer or any instruction execution system.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Abbreviations
J2EE Java™ 2 Platform Enterprise Edition
SCA Service Component Architecture
SOA Service oriented architecture.
WSDL Web Service Definition Language
WSRR IBM WebSphere Registry and Repository
XML extensible mark-up language
XSD XML Schema Definition

NOTICES

IBM and WebSphere are registered trademarks or trademarks of International Business Machines Corporation in the United States and/or other countries. Java and all Java-based trademarks are trademarks of Sun Microsystems, Inc. in the United States, other countries, or both. Eclipse is a trademark of Eclipse Foundation, Inc.

Having thus described the invention of the present application in detail and by reference to embodiments thereof, it will be apparent that modifications and variations are possible without departing from the scope of the invention defined in the appended claims.

What is claimed is:

1. A method for operating a service registry and repository based on a triplestore database comprising:
receiving a request to aggregate web service policy information associated with an identified service document;
parsing the identified service document and other documents referred to in the identified service document to create an object list of logical objects, where the logical objects are stored within the triplestore, further including:
deriving a set of objects from the object list that represent the contents of the service document; and
linking the derived objects together in the triplestore such that the structure of the service document can be retrieved as an object graph;
searching within the identified service document and the contents of the repository, to locate all web service policy attachments that have an association with a corresponding logical object within the object list;
building a list of all of the located web service policy attachments and their corresponding logical objects;
retrieving, for each located web service policy attachment, details of the web service policy attachment; and
returning an aggregated service document that aggregates the located web service policy attachments such that policy details of the located web service policy attachments that have relationships with the logical objects of the object list are accessible from the aggregated service document.

2. The method according to claim 1, further comprising rendering objects in the service document that have associated polices with a hypertext policy icon next to the object.

3. The method according to claim 2, further comprising opening a select one of a new browser window, tab window or pop up window, with the policy details, upon selection of the hypertext policy icon.

4. The method according to claim 1, wherein searching within the identified service document and the contents of the repository, comprises searching over a whole repository, wherein the repository indicates another repository to be searched.

5. The method according to claim 1, wherein receiving a request to aggregate web service policy information associated with an identified service document comprises:
using a universal resource identifier to identify the identified service document in the repository inside an internet message containing a request to aggregate policies for the identified service document.

6. The method according to claim 1, wherein building a list of all of the located web service policy attachments and their corresponding logical objects comprises:
including all the policy details so that a user can examine what policies are related to the document.

7. The method according to claim 1, wherein building a list of all of the located web service policy attachments and their corresponding logical objects comprises:
including only references to the policies in the aggregated service document.

8. The method according to claim 1, wherein parsing the identified service document and other documents referred to in the identified service document comprises:
shredding elements of the requested service document to create the logical objects.

9. The method according to claim 8, wherein shredding elements of the requested service document, comprises:
deriving a set of objects that represent the contents of the requested service document; and
linking the derived objects together in the triplestore such that the structure of the requested service document can be retrieved as an object graph.

10. The method according to claim 1, wherein searching within the service document and the contents of the repository, to locate all web service policy attachments that have an association with a corresponding logical object comprises:
parsing each located policy for an association to or from a created logical object.

11. The method according to claim 1, further comprising linking the logical objects in the triplestore to define an object graph that represents the structure of the content of the requested service document.

12. A computer program product to operate a service registry and repository based on a triplestore database comprising:
a computer readable storage medium having computer readable program code embodied therewith, the computer readable program code comprising:
computer readable program code configured to receive a request to aggregate web service policy information associated with an identified service document;
computer readable program code configured to parse the identified service document and other documents referred to in the identified service document to create an object list of logical objects, where the logical objects are stored within the triplestore, further including:
computer readable program code configured to derive a set of objects from the object list that represent the contents of the service document; and
computer readable program code configured to link the derived objects together in the triplestore such that the structure of the service document can be retrieved as an object graph;
computer readable program code configured to search within the identified service document and the contents of the repository, to locate all web service policy attachments that have an association with a corresponding logical object within the object list;
computer readable program code configured to build a list of all of the located web service policy attachments and their corresponding logical objects;
computer readable program code configured to retrieve, for each located web service policy attachment, details of the web service policy attachment; and
computer readable program code configured to return an aggregated service document that aggregates the located web service policy attachments such that policy details of the located web service policy attachments that have relationships with the logical objects of the object list are accessible from the aggregated service document.

13. The computer program product according to claim 12, further comprising:
computer readable program code configured to render objects in the aggregated service document that have associated at least one web service policy attachment with a hypertext policy icon next to the object.

14. The computer program product according to claim 13, further comprising:
computer readable program code configured to open a new browser window, tab window or pop up window with the policy details in response to a selection of the hypertext policy icon.

15. The computer program product according to claim 12, wherein the contents of the searched repository includes a reference to another repository; and wherein the computer readable program code configured to search within the identified service document and the contents of the repository, comprises:
computer readable program code configured to search the referenced repository.

16. The computer program product according to claim 12, wherein the computer readable program code configured to receive a request to aggregate web service policy information associated with an identified service document comprises:
computer readable program code configured to use a universal resource identifier to identify the identified service document in the repository inside an internet message containing a request to aggregate policies for the identified service document.

17. The computer program product according to claim 12, wherein the computer readable program code configured to build a list of all of the located web service policy attachments and their corresponding logical objects comprises:
computer readable program code configured to build a list that includes all the policy details of the located web service policy attachments, wherein the policy details are included directly in the aggregated service document so that a user can examine the policies that are related to the aggregated service document from policy details included within the document itself.

18. The computer program product according to claim 12, wherein the computer readable program code configured to build a list of all of the located web service policy attachments and their corresponding logical objects comprises:

computer readable program code configured to build a list that includes references to the policy details of the web service policy attachments that are related to corresponding logical objects.

19. The computer program product according to claim 12, wherein the computer readable program code configured to parse the identified service document and other documents referred to in the identified service document comprises:
   computer readable program code that shreds elements of the requested service document to create the logical objects.

20. The computer program product according to claim 12, wherein the computer readable program code configured to search within the service document and the contents of the repository, to locate all web service policy attachments that have an association with a corresponding logical object comprises:
   computer readable program code to parse each located policy for an association to or from a created logical object.

21. The computer program product according to claim 12, further comprising computer readable program code configured to link the logical objects in the triplestore to define an object graph that represents the structure of the content of the requested service document.

22. The computer program product according to claim 12, further comprising computer readable program code to return the aggregated service document to a user as an aggregated view that is displayed through a user interface that presents a view of the requested service document.

23. The computer program product according to claim 12, further comprising computer readable program code to provide the aggregated service document to a browser that renders the aggregated service document.

24. The computer program product according to claim 23, further comprising computer readable program code to render the logical objects having an associated web service policy attachment differently than logical objects that have no associated web service policy attachment.

25. The computer program product according to claim 23, further comprising computer readable program code to represent at least one web service policy attachment in the aggregated service document as a reference that links to the corresponding policy details, which are stored in the repository.

26. The computer program product according to claim 23, wherein at least one web service policy attachment includes its corresponding policy details directly embedded within the aggregated policy document.

27. The computer program product according to claim 12, further comprising computer readable program code to render the aggregated service document on a display such that aggregated service document code is displayed in a first window and aggregated policy details are displayed in a second window.

* * * * *